United States Patent [19]

Gospodar et al.

[11] 4,192,202

[45] Mar. 11, 1980

[54] APPARATUS FOR CONTROLLING THE CLOSING LIMIT OF A CARBURETOR THROTTLE VALVE

[75] Inventors: Reinhard Gospodar; Paulus Heidemeyer, both of Wolfsburg, Fed. Rep. of Germany

[73] Assignee: Volkswagenwerk Aktiengesellschaft, Wolfsburg, Fed. Rep. of Germany

[21] Appl. No.: 843,568

[22] Filed: Oct. 19, 1977

[30] Foreign Application Priority Data

Oct. 29, 1976 [DE] Fed. Rep. of Germany ....... 2649473

[51] Int. Cl.[2] ........................ B60K 41/18; F02D 11/08

[52] U.S. Cl. .................................. 74/859; 123/103 A

[58] Field of Search .......................... 74/859, 857, 856; 123/103 A, 108, 97 B

[56] References Cited

U.S. PATENT DOCUMENTS

| | | | |
|---|---|---|---|
| 2,921,641 | 1/1960 | Wetterhahn | 123/103 A X |
| 3,486,595 | 12/1969 | Turner | 123/97 B X |
| 3,603,297 | 9/1971 | Sherwin et al. | 123/97 B |
| 3,603,298 | 9/1971 | Toda et al. | 123/97 B X |
| 3,626,915 | 12/1971 | Nakajima | 123/97 B X |
| 3,782,346 | 1/1974 | Tatsutomi et al. | 123/97 B |
| 3,821,943 | 7/1974 | Toda et al. | 123/97 B |
| 4,026,168 | 5/1977 | Kobayashi | 74/857 X |

*Primary Examiner*—Lance Chandler

*Attorney, Agent, or Firm*—Brumbaugh, Graves, Donohue & Raymond

[57] ABSTRACT

Apparatus for controlling the closing limit of a carburetor throttle valve in a motor vehicle having an automatic transmission with a shift control that includes a governor producing a speed-dependent pressure. The apparatus comprises a vacuum-actuated device for varying the closing limit of the throttle valve in dependence upon the vacuum applied thereto; a vacuum line connecting the vacuum actuated device with a source of intake manifold vacuum downstream of the throttle valve; a hydraulic or solenoid valve arranged in the vacuum line for controlling the vacuum transmitted by the line; and a hydraulic or electrical circuit for controlling this valve in dependence upon the speed-dependent pressure produced by the governor.

5 Claims, 3 Drawing Figures

APPARATUS FOR CONTROLLING THE CLOSING LIMIT OF A CARBURETOR THROTTLE VALVE

BACKGROUND OF THE INVENTION

The present invention concerns apparatus for controlling a vacuum actuated device which adjusts the closing limit of a carburetor throttle valve of a motor vehicle internal combustion engine of the type in which the fuel-air mixture is supplied to the engine intake manifold. The invention is applicable to motor vehicles equipped with an automatic transmission capable of being shifted in response to signals produced by a hydraulic transmission control unit with at least one governor supplying a speed-dependent pressure. A control valve, arranged in the vacuum line extending from the intake pipe or manifold of the internal combustion engine to the aforementioned closing adjustment mechanism is actuated as a function of the driving speed of the vehicle.

In order to decrease the emission of noxious substances during deceleration operation of motor vehicle (automobile) engines of the aforementioned type, a technique is known whereby the carburetor throttle valve is opened sufficiently widely, during this operation state, to supply an adequate quantity of air for combustion of the fuel which reaches the combustion chambers. This throttle valve position is customarily achieved by means of a vacuum-actuated device that receives vacuum through a connecting line from the intake pipe or manifold of the engine.

A vacuum of approximately 370 mm Hg in the intake pipe is normally required for optimal combustion during deceleration operation of an automobile engine. However, this vacuum level is less than the normal idling vacuum of approximately 400 mm Hg so that, during idling, the throttle valve-controlling vacuum actuated device would tend to open the throttle slightly, and thereby increase the speed of the engine, if measures were not taken to prevent this from occurring. It is known from the German patent publication (DOS) No. 2,046,436 to cut off the intake vacuum to the vacuum-actuated device at low vehicle speeds. To this end the vacuum line leading from the intake pipe to the vacuum-actuated device is provided with an electromagnetically-actuated (solenoid) control valve which is switched as a function of vehicle speed by a relatively costly electronic circuit.

An object of the present invention is to provide apparatus, distinguished by low manufacturing cost and high reliability, for controlling the closing limit of a carburetor throttle valve for motor vehicles having an automatic transmission.

SUMMARY OF THE INVENTION

In accordance with the invention, the control valve, arranged in the vacuum line connecting the vacuum-actuated closing adjustment device with a source of vacuum, is itself controlled by the governor-generated pressure that is a function of the driving speed. Due to the fact that this pressure is already available in the transmission control unit of an automatic transmission the control apparatus of the present invention, which simply utilizes this pressure, is inexpensive to manufacture.

According to one preferred embodiment of the invention, the control valve is designed as a hydraulic valve which is directly responsive to the regulating pressure of the governor. According to another preferred embodiment, the control valve is designed as a solenoid valve which is actuated by an electric circuit having a pressure switch responsive to the regulating pressure of the governor. For automatic transmissions in which the hydraulic transmission control unit is provided with a so-called "step pressure slide valve" controlled by the governing pressure, this variable-pressure slide valve may be employed as a pressure switch for control of the solenoid control valve. This is accomplished by providing the slide valve with switch contacts which are connected into the circuit acting on the control valve. The step pressure slide valve, which is responsive to governor pressure to perform a shifting operation within the transmission control unit in a speed range of 25 to 30 Km/hour, is therefore also suitable for cutting off the throttle valve closure-limiting device.

For the sake of practicality, the hydraulically actuated control elements may be provided with means for producing a gear shift hysteresis so as to prevent undesirable rapid shifting back and forth during operation of the vehicle in the pertinent speed range.

For a better understanding of the invention, together with other and further objects, reference is made to the following description, taken in conjunction with the accompanying drawings, and its scope will be pointed out in the appended claims.

DESCRIPTION OF THE PREFERRED EMBODIMENTS

Figure 1:
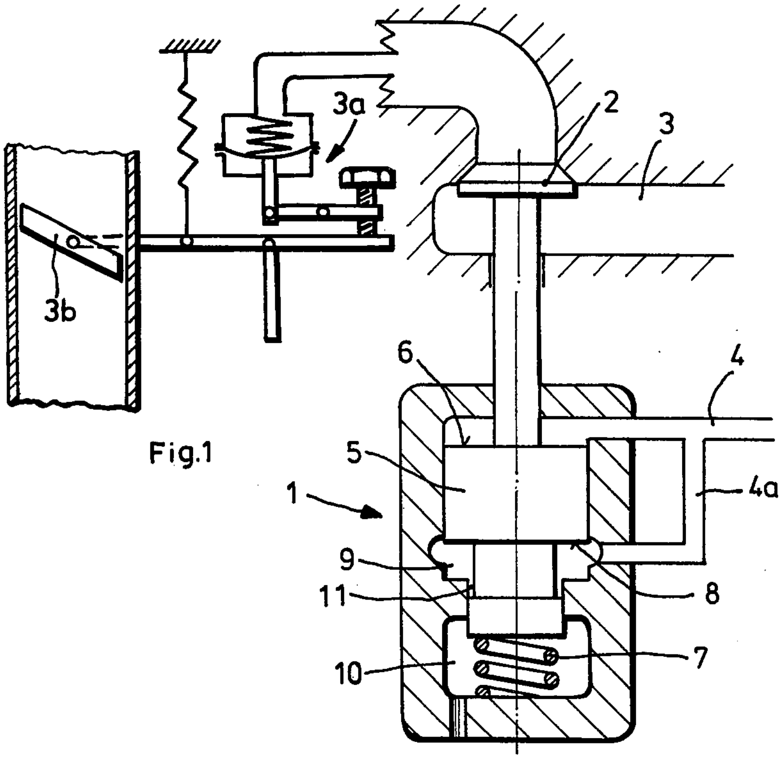
FIG. 1 is a schematic diagram of the control device, pursuant to a first embodiment of the invention, with a hydraulically actuated control valve.

FIG. 1 of the drawings shows purely hydraulic means for controlling the closing limit of a carburetor throttle valve. In this embodiment a hydraulically actuated control valve 1 has a valve element 2 arranged to close off a vacuum line 3 leading from a tapping point of the intake manifold of an internal combustion engine (not shown) to the vacuum-actuated closure-limiting device 3*a* of a carburetor throttle valve 3*b*. The valve element 2 remains closed as long as a fluid pressure, dependent on driving speed and supplied by a line 4, is below a prescribed value. In automobiles equipped with an automatic transmission this speed-dependent pressure is produced by a governor, usually designed as centrifugal governor, and is utilized in the control of the transmission. The pressure acts on a large active surface 6 of a control slide valve 5 in the control valve 1 and serves to press the control slide valve 5 downward, in the sense shown in the drawing, in opposition to the force exerted by a spring 7. The force of the spring 7 has been so chosen that a displacement of the control slide valve 5 and, thus, an opening of the vacuum line 3 by a valve element 2 occurs only when the governing pressure supplied by the line 4 attains a value corresponding to an automobile speed of about 25 to 30 Km/hour. Below this vehicle speed, there is hardly any deceleration of the engine because the engine speed is not substantially greater than its idling speed. The intake manifold vacuum limitation can therefore be shut off at this range with the result that the undesirable increase in engine speed during idling is eliminated and the tendency of the vehicle to roll forward when the gear shift selector is moved to the "drive" position is held within limits.

In order to prevent the control valve from being constantly shifted back and forth during operation of the vehicle in this speed range, switching hysteresis is provided in the embodiment shown in FIG. 1 by applying the governing pressure to an annular step surface 8 of the control slide valve 5 through a branch line 4*a*. As long as the control valve 1 remains in the closed position shown in the drawing, the governor pressure acting on the annular step surface 8 exerts a closing force reinforcing the force of the spring 7 in opposition to the opening force applied by the governor pressure on the large active surface 6. After the control valve opens, the pressure supplied to the step surface 8 is cut off by the control slide valve 5. At the same time the pressure space 9 associated with the surface 8 is connected with the pressureless spring space 10 through a recess 11 arranged on the jacket of the control slide valve 1. The resulting relief of the pressure applied to the step surface 8 brings about rapid and complete opening of the control valve.

The closing of the control valve 1 takes place at a lower governing pressure than does the opening, and thus also at a lower speed of the vehicle. In the open position of the control valve 1, only the force of the spring 7 acts in the closing direction in opposition to the governing pressure acting on the large pressure surface 6 of the control slide valve 5. The pressure-medium is supplied to the step surface 8, and simultaneously the connection between the pressure space 9 and the spring space 10 is interrupted, only after the valve element 2 has almost completely attained the closing position. Only then does the governor pressure act on the step surface 8 of the control slide valve 5 and thus aid in the closing process of the control valve.

Figure 2:
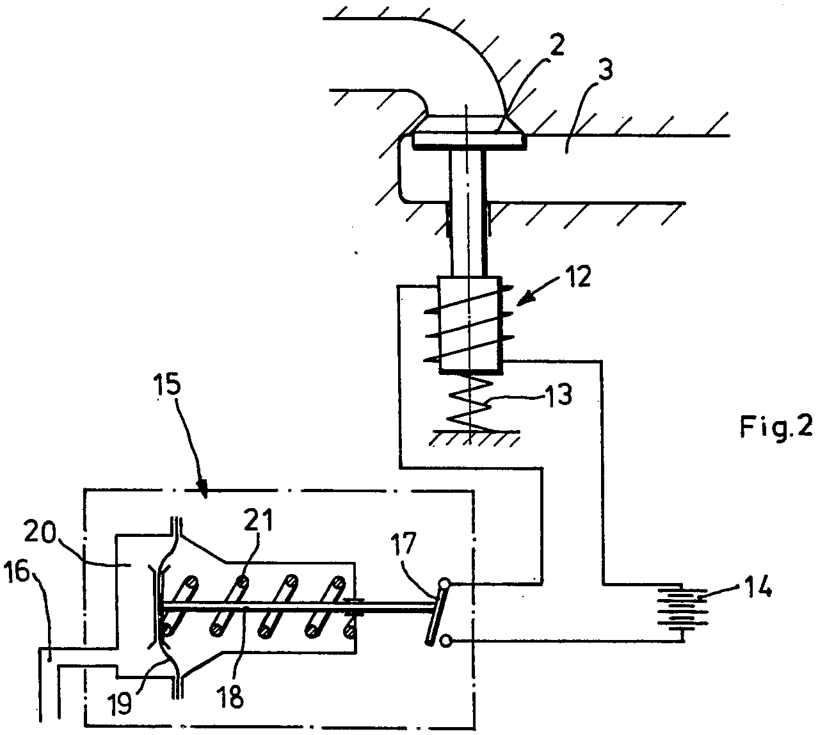
FIG. 2 is a schematic diagram of the control device, pursuant to a second embodiment of the invention, in which the control valve is controlled by a solenoid that is, in turn, controlled by a pressure switch responsive to the governor pressure.

FIG. 2 shows another embodiment of the control device pursuant to the invention, in which the control valve 12 has been designed as an electromagnetically-actuated (solenoid) valve. In this case also, the valve element, and the vacuum line interrupted by the valve element, are denoted by the reference numerals 2 and 3, respectively. A spring 13 keeps the electromagnetic control valve 12 in the closed position. The valve is opened by supplying electrical current from an energy source 14, such as the vehicle battery. A pressure switch 15, which receives the speed-dependent pressure via a fluid line 16 from the governor provided in the transmission control unit, is provided in the circuit to control the current acting on the electromagnetic control valve 12. The fluid pressure is supplied to a pressure space 20 delimited by a movable membrane 19 which is displaced by the pressure in opposition to the action of a spring 21. Upon displacement of the membrane 19, which is again effected at a pressure corresponding to a speed of 25 to 30 Km/hour, a connecting rod 18 closes the switch 17 so that current is supplied to the electromagnetic control valve.

Figure 3:
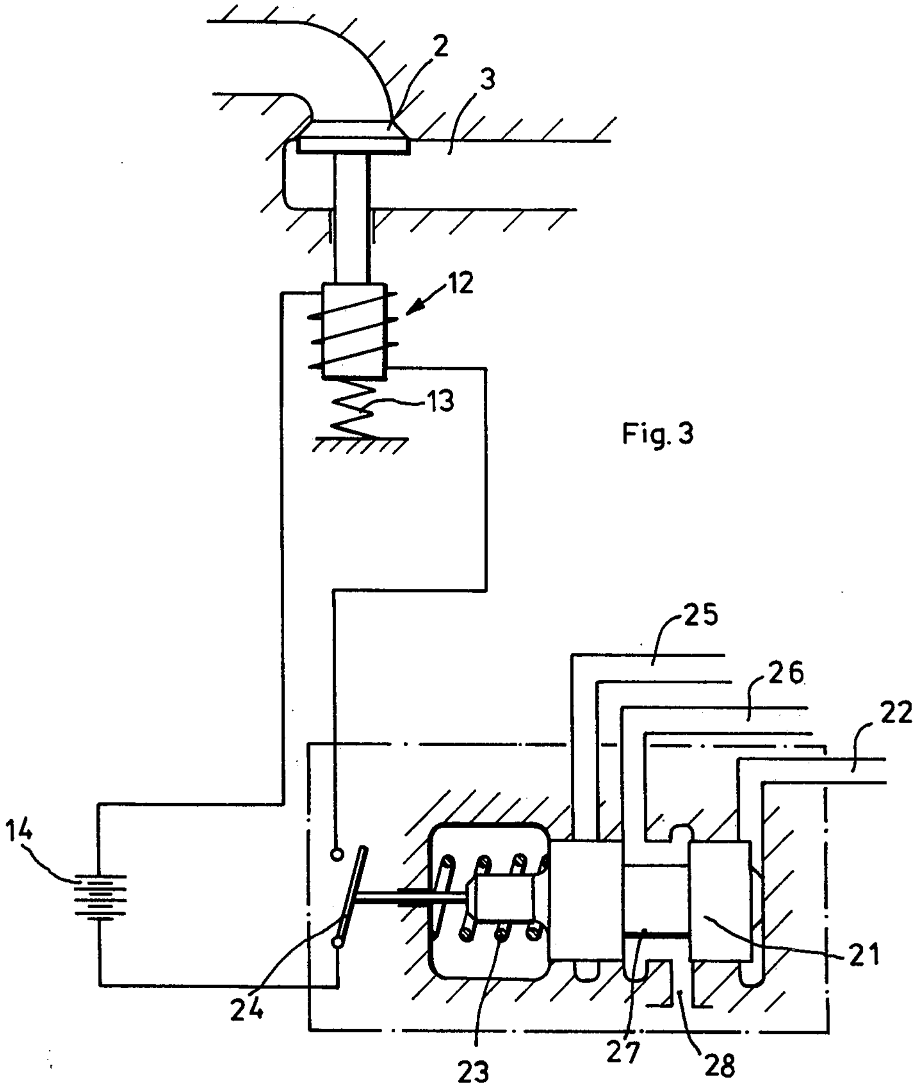
FIG. 3 is a schematic diagram of the control device, pursuant to a third embodiment of the invention, in which the control valve is responsive to a variable-pressure slide valve provided in the transmission control unit of the automatic transmission.

Finally, FIG. 3 shows an embodiment wherein the pressure switch, employed in the embodiment of FIG. 2, is formed by a so-called "step pressure slide valve" of the transmission control unit. The speed-dependent pressure produced by the centrifugal governor is applied through a line 22 to one end face of this step pressure slide valve, formed by a piston 21. This pressure is counteracted by the force of a spring 23 arranged to press against the opposite end surface and dimensioned such that the slide valve is maintained in the position shown in FIG. 3 until the governor pressure exceeds the value corresponding to a speed of 30 Km/hour. As the governor pressure increases beyond this value, it shifts the step pressure slide valve to the left, in the sense shown in the drawing, causing the switch 24 to close the switch contacts arranged in the circuit connected to the electromagnetic control valve 12, thereby opening the control valve. At the same time, the step pressure slide valve 21 connects two pressure lines 25 and 26 by means of a recess 27 provided in the piston 21. As a result, the limited gas pressure of the main pressure limiting slide valve of the transmission control unit (not shown here) is passed from line 25 to line 26 and applied to a control surface. Previously, the pressure on line 26 was at zero (gauge), with the step pressure slide valve in the position shown in the drawing because the line 26 was connected with an outlet 28 via the slide valve recess 27.

In the embodiments shown in FIGS. 2 and 3, a switching hysteresis may be present due to the effects of friction on the pressure switch, or upon the step pressure slide valve, so that the movement of these switches in one direction (open or close) takes place at a different speed from the movement in the opposite direction.

While there have been described what are believed to be the preferred embodiments of the present invention, those skilled in the art will recognize that various changes and modifications may be made thereto without departing from the spirit of the invention, and it is intended to claim all such embodiments as fall within the true scope of the invention.

We claim:

1. In a motor vehicle having an internal combustion engine and an automatic transmission, said engine including an intake manifold and a carburetor with a throttle valve for supplying a fuel-air intake mixture to said intake manifold, said transmission including hydraulic control means for shifting said transmission and having at least one governor producing a first, speed-dependent hydraulic fluid pressure, apparatus for controlling the closing limit of said carburetor throttle valve comprising:

(a) vacuum pressure actuated means for varying the closing limit of said throttle valve in dependence upon a second vacuum pressure applied thereto;

(b) a vacuum line connecting said vacuum actuated means with a source of said second vacuum pressure downstream of said throttle valve;

(c) valve means arranged in said vacuum line for controlling said second vacuum pressure transmitted by said line; and (d) means, coupled to said governor, for controll-said valve means in dependence upon said first speed-dependent fluid pressure said means including a control element movable by said first fluid pressure against a spring.

2. The control apparatus defined in claim 1, wherein said valve means is a hydraulic valve, and wherein said control element includes a piston movable in a cylinder in response to said pressure.

3. The control apparatus defined in claim 1, wherein said valve means is a solenoid valve, and said controlling means comprises a pressure switch responsive to said speed-dependent pressure and circuit means, connected to said pressure switch, for supplying a voltage to said solenoid valve in dependence upon the position of said pressure switch.

4. The control apparatus defined in claim 3, wherein said hydraulic transmission control means includes a step pressure slide valve responsive to said speed-dependent pressure, and wherein said pressure switch includes a switching contact, actuated by and responsive to the position of said slide valve.

5. The control apparatus defined in claim 1, wherein said means for controlling said valve means includes means for producing a switching hysteresis.

* * * * *